United States Patent [19]

Nakajima et al.

[11] Patent Number: 5,226,817
[45] Date of Patent: Jul. 13, 1993

[54] BRAILLE CELL

[75] Inventors: Mitsuru Nakajima; Kunihiro Suzuki; Hong R. Su; Yoshiyuki Tani; Akiyoshi Morita, all of Urayasu, Japan

[73] Assignee: KGS Corporation, Chiba, Japan

[21] Appl. No.: 742,635

[22] Filed: Aug. 8, 1991

[30] Foreign Application Priority Data

Aug. 13, 1990 [JP] Japan ............... 2-85634[U]

[51] Int. Cl.$^5$ ............................................. G09B 21/00
[52] U.S. Cl. ................................. 434/113; 434/112; 434/114; 434/115; 434/117
[58] Field of Search ................. 434/112-115, 434/117; 400/122

[56] References Cited

U.S. PATENT DOCUMENTS 4,283,178  8/1981  Tetzlaff.
4,473,356  9/1984  Fernando et al..
4,633,121  12/1986  Ogawa et al..
4,664,632  5/1987  Tretiakoff et al..
4,758,165  7/1988  Tieman et al..

Primary Examiner—Richard J. Apley
Assistant Examiner—Glenn E. Richman
Attorney, Agent, or Firm—Frishauf, Holtz, Goodman & Woodward

[57] ABSTRACT

The present invention discloses a braille cell comprising plural piezoelectric element reeds which are bent at the free ends thereof when DC voltage is added to them, a base body to which the piezoelectric element reeds are fixed at the base ends thereof through a print circuit board and which supports the piezoelectric element reeds piled like steps at a certain interval, and tactile pins provided corresponding to the free ends of the piezoelectric element reeds, wherein a tactile section for holding the tactile pins and provided with a detachably attaching means is detachably attached to the base body and wherein fixing plates are attached to both sides of the base body by means of their detachable attachment which is to define the piezoelectric element reeds in left and right directions of the base body.

6 Claims, 6 Drawing Sheets

BRAILLE CELL

BACKGROUND OF THE INVENTION

1. Field of the Invention

The present invention relates to a braille cell improved in its maintenance and manufacture and, more particularly, it relates to a braille cell used as a personal electronic terminal to transmit information, without using any sheet of paper, to persons who have trouble with their eyes.

When the conventional braille cell of this kind is often used, tactile pins which are most often touched by fingers and those portions of a member which enclose these tactile pins become severely worn and dirty. When the tactile pins and the member become unduly worn and dirty, they must be replaced with new ones. In addition, piezoelectric element reeds which make the tactile pins operative are relatively often broken and this also requires them to be replaced with new ones.

As disclosed in Japanese Utility Model Disclosure Sho 62-71673, European Patent No. 0237090 and U.S. Pat. No. 4758165, the braille cell includes the tactile pins provided on free ends of the piezoelectric element reeds and projected outside from a finger scanning section at the tips thereof. In the case of these finger scanning section and tactile pins, dust adheres to their exposed portions and to pins-inserting holes as well. In addition, they are made dirty by greasy fingers when they are unceasingly and directly touched by fingers to touch-read braille characters. However, the conventional tactile section is formed integral to a base body of the braille cell. This makes it impossible to detach the tactile section from the base body while holding the tactile pins therein, or wash the tactile section as a unit and to exchange the tactile section with a new one.

Piezoelectric element reeds disclosed by Japanese Utility Model Disclosure Sho 62-71673 are directly bonded to the base body by adhesive. This makes it difficult to exchange the piezoelectric element reeds with new ones. A support member disclosed in European Patent No. 0237090 and U.S. Pat. No. 4758165 is U-shaped to hold piezoelectric element reeds in its curved inner face and is bonded to a frame by adhesive. This also makes it difficult to exchange the piezoelectric element reeds with new ones. These conventional braille cells make it difficult to exchange the piezoelectric element reeds with new ones, and the whole braille cell must be sometimes exchanged with a new one to exchange the piezoelectric element reeds with new ones.

SUMMARY OF THE INVENTION

The present invention is therefore intended to eliminate the above-mentioned drawbacks and the object of the present invention is to provide a braille cell capable of making the maintaining and controlling of the electronic braille terminal easier, the maintaining, exchanging and assembling of the braille cell easier, and enabling of washing of he tactile section and the tactile pins as a unit without detaching the tactile pins from the tactile section.

This object of the present invention can be achieved by a braille cell comprising plural piezoelectric element reeds which are bent at the front ends thereof when a DC voltage is applied to them, a base body to which the piezoelectric element reeds are fixed at the base ends thereof through a printed circuit board which supports the piezoelectric element reeds piled like steps at a certain interval, and tactile pins provided on corresponding free ends of the respective piezoelectric element reeds, wherein a tactile section for holding the tactile pins and provided with a detachably attaching means is detachably attached to the base body.

The present invention also comprises fixing plates for defining the piezoelectric element reeds in left and right directions are detachably attached to both sides of the base body.

The present invention also comprises allowing the piezoelectric element reeds to be attached to the base body without using any adhesive is detachably supported and fixed to the base body.

The present invention also comprises providing a cap for the tactile section for holding the tactile pins therein.

As described above, the following merits can be provided by the braille cell of the present invention.

1) The tactile section for holding the tactile pins therein is detachably attached to the base body. This makes it easier to maintain the tactile pins and the tactile section and to exchange them with new ones. The maintaining work of them can be thus made simpler.

2) The tactile section for holding the tactile pins therein is detachably attached to the base body. This enables the tactile section and the tactile pins to be washed as a unit without detaching the tactile pins from the tactile section. Therefore, pin-inserting holes can be also more easily washed in addition to the tactile pins and the exposed portion of the tactile section.

3) The cap attached to the tactile section makes it easier to maintain and exchange the tactile pins with new ones.

4) The fixing plates detachably attached to the both sides of the base body makes it easier to attach and assemble the piezoelectric element reeds with the base body.

5) The attaching of the piezoelectric element reeds can be achieved without using any adhesive and the print circuit board can be detached from the base body. This makes it easier to exchange the piezoelectric element reeds and the print circuit board with new ones.

6) Stoppers against which free ends of the piezoelectric element reeds are struck can prevent the piezoelectric element reeds from being broken by impacts caused during transportation and reduce the chattering of them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The braille cell according to a first embodiment of the present invention will be described in detail with reference to the accompanying drawings.

Figure 1A:
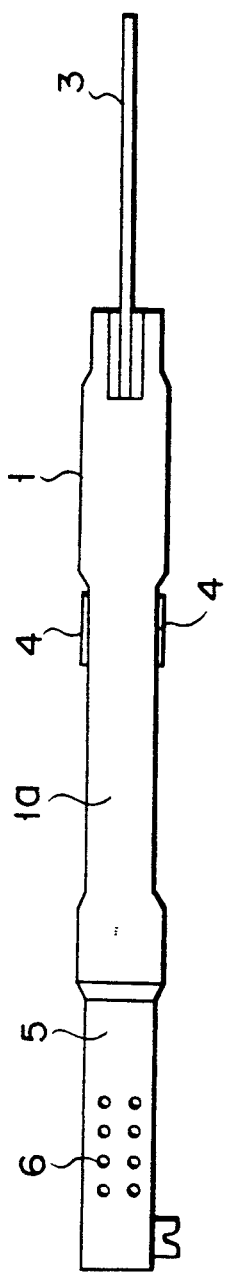
FIGS. 1A and 1B are plan and side views showing the braille cell according to a first embodiment of the present invention.
Figure 1B:
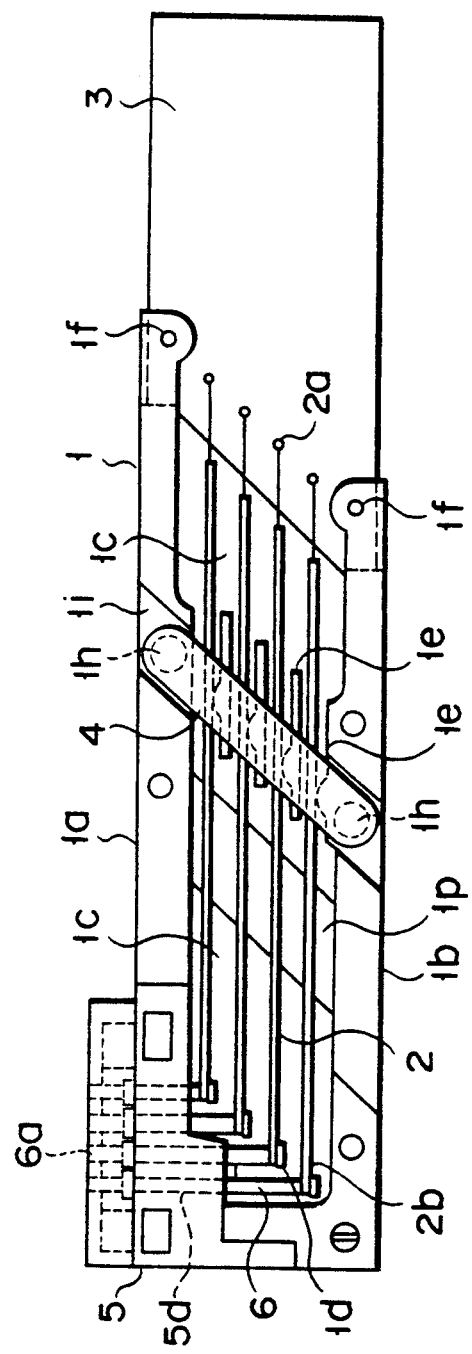

The first embodiment of the present invention will be described referring to FIGS. 1A, 1B, 2 and 3A. FIGS. 1A and 1B are plan and side views showing the braille cell according to the first embodiment of the present invention. Reference numeral 1 represents a base body and this base body 1 is made thick at its top and bottom 1a and 1b while a partition plate 1c for connecting the top 1a and the bottom 1b of the base body 1 to each other is made so thin as to allow side grooves for housing piezoelectric element reeds 2 therein to be formed at both sides of the partition plate 1c. Stoppers 1d for controlling the piezoelectric element reeds 2 not to be displaced by impact or the like to such an extent that the piezoelectric element reeds 2 are broken by their own displacement, and fulcrums 1e for increasing the pushing force exerted by tactile pins are projected from both sides of the partition plate 1c. Further, the bottom 1b of the base body 1 is also provided with a fulcrum 1e which is used for the lowest piezoelectric element reeds 2.

Figure 2:
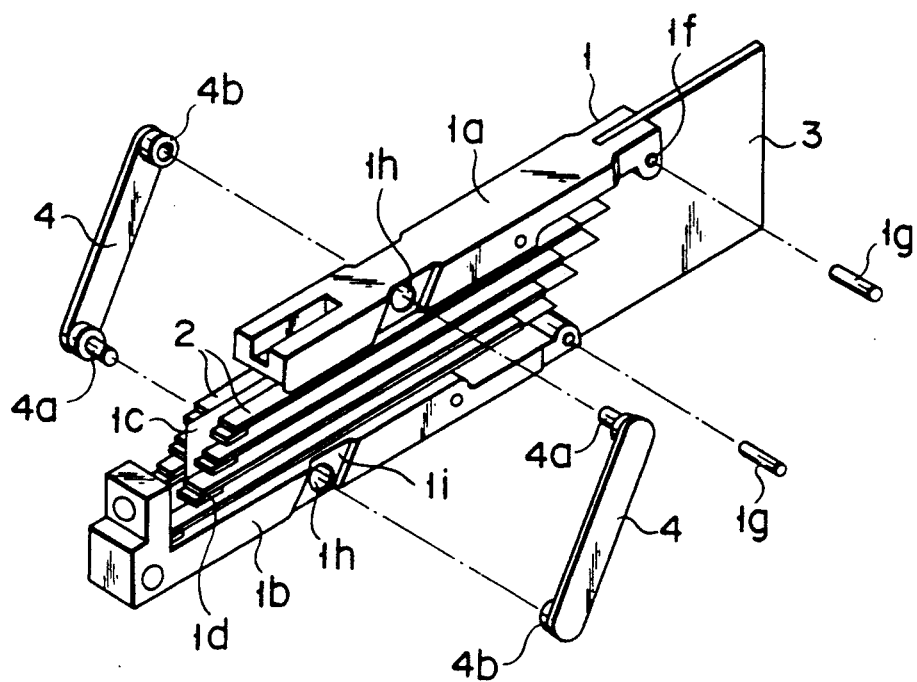
FIG. 2 is a perspective view intended to explain the method of attaching fixing plates in the first embodiment of the braille cell according to the present invention.

In order that the plural piezoelectric element reeds 2 are housed at a certain interval and in a step on both sides of the partition plate 1c of the base body 1, base ends 2a of the piezoelectric element reeds 2 are fixed to both sides of a printed circuit board 3 by soldering and this printed circuit board 3 is detachably fixed to the base body 1, using fixing holes 1f formed at the top 1a and bottom 1b of the base body 1 and spring pins 1g shown in FIG. 2.

As shown in FIGS. 1 and 2, through-holes 1h are formed at the sides of the top 1a and bottom 1b of the base body 1, and a shallow groove 1i extending from the through-hole 1h at the side of the top 1a to the through-hole 1h at the side of the bottom 1b is formed on both sides of base body 1. A fixing plate 4 is fitted onto each of the sides of the base body 1, using the through-holes 1h and the shallow groove 1i, and these paired fixing plates 4 thus fitted onto the both sides of the base body 1 serve to limit left and right movements of etch of the piezoelectric element reeds 2, which are housed on the both sides of the partition plate 1c, relative to the base body 1.

The partition plate 1c is also provided with a ventilation window 1p which allows the piezoelectric element reeds 2 on the both sides of the partition plate 1c to be confirmed and which enables the convection radiation of air to be enhanced.

As shown in FIG. 2, the fixing plates 4 on left and right sides of the base body 1 form pair and these paired fixing plates 4 are fitted to each other by their projections 4a on the sides thereof and their protruded holes 4b formed on the sides thereof to correspond to their projections 4a, so that the piezoelectric element reeds 2 on the both sides of the partition plate 1c can be defined in left and right directions by these paired fixing plates 4.

Figure 3A:
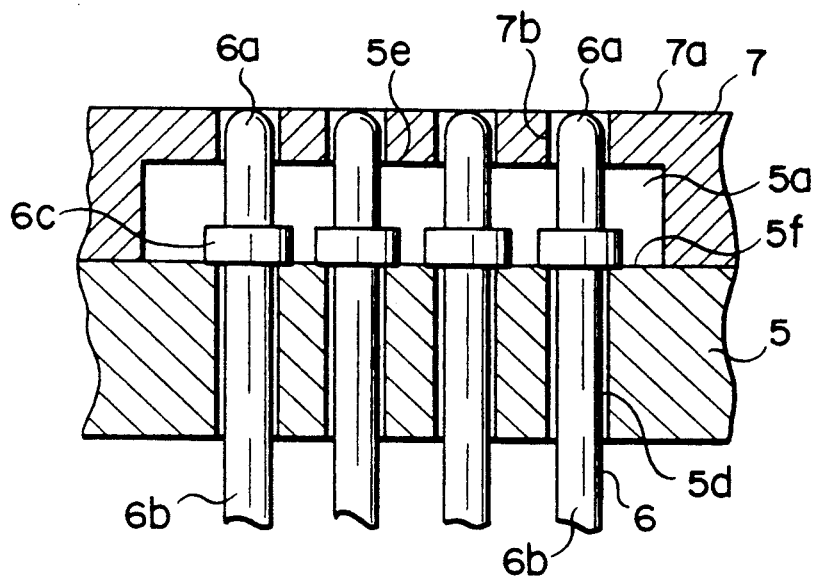
FIGS. 3A and 3B are sectional views showing tactile sections partially enlarged in braille cells according to first, second and third, fourth embodiments of the present invention.

A tactile section 5 is detachably attached to the top 1a and bottom 1b of the base body 1 at the front or left ends thereof as shown in FIG. 1 and tactile pins 6 as shown in the enlarged sectional view in FIG. 3A are inserted into plural holes 5d formed at the tactile section 5 to correspond to their respective piezoelectric element reeds 2 while keeping them mounted on free ends 2b of their respective piezoelectric elements reeds 2 at their bottom ends.

Figure 3B:
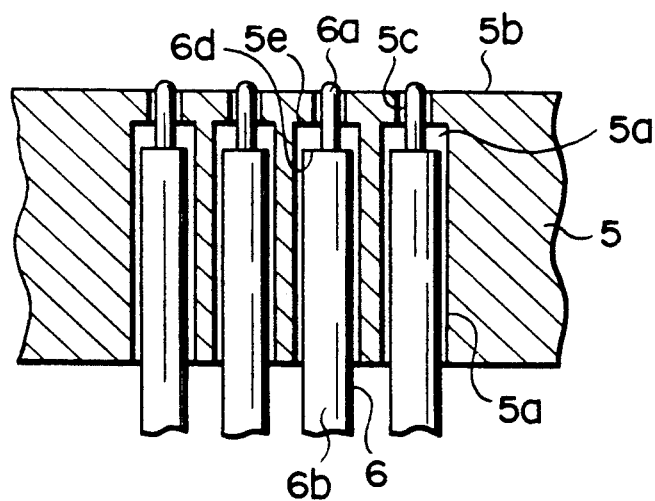
Figure 4:
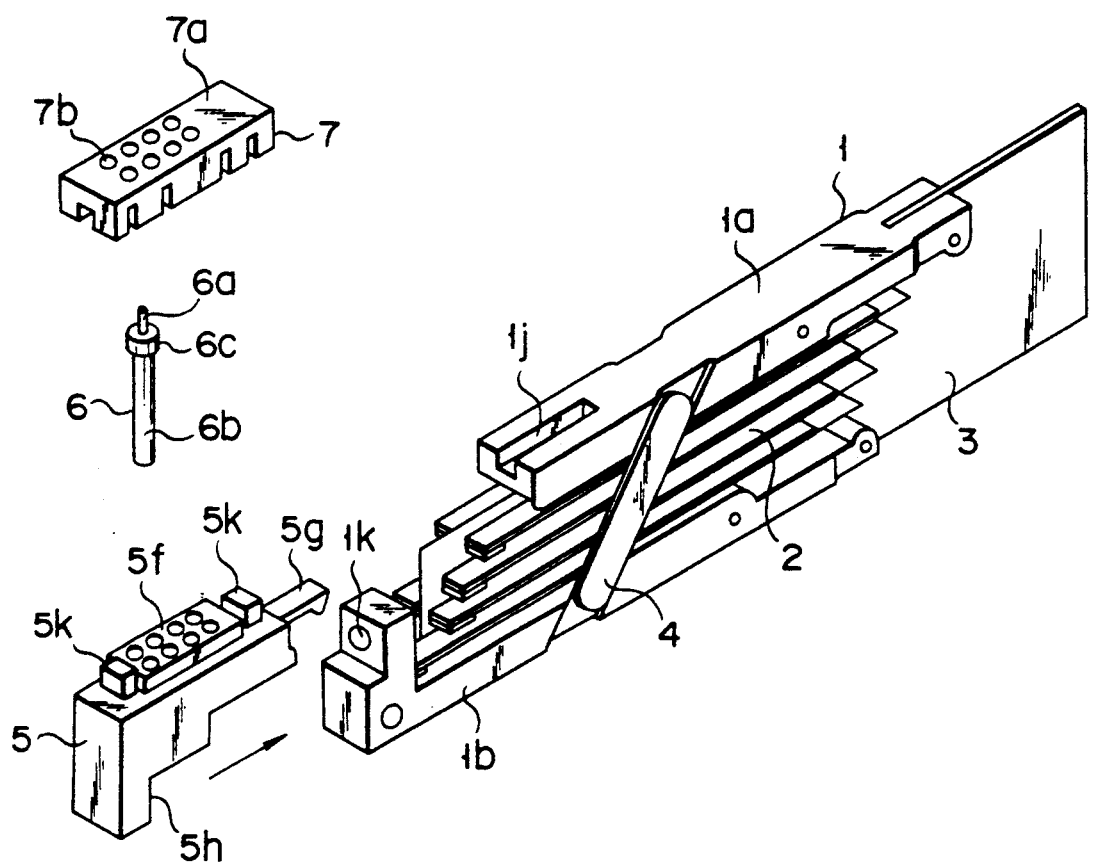
FIG. 4 is a perspective view intended to explain how the tactile section is detachably attached to the base in the case of the first embodiment of the present invention.

FIGS. 3A and 3B are sectional views showing the tactile sections 5 enlarged in cases of this first embodiment and a second embodiment of the present invention which will be described later. A rectangular lid-like cap 7 whose top is made of elastic material and whose bottom is made open, as shown in FIG. 4, is attached to the tactile section 5. This cap 7 is provided with through-holes 7b through which tactile tips 6a of the tactile pins 6 are projected from the surface 7a of the cap 7.

A section 5a through which the tactile pins 6 are inserted comprises small-diameter through-holes 7b reaching the surface 7a of the cap 7, and holes 5d. Upper and lower pin stoppers 5e and 5f are common to the through-holes 7b and the pins-inserting holes 5d. Each of the tactile pins 6 inserted into the pins-inserting section 5a comprises the small-diameter tactile tip 6a passed through the through-hole 7b of the cap 7, a portion 6b so different in length as to correspond to that piezoelectric element reeds 2 on which the tactile pin 6 is mounted at the lower end thereof, and a collar 6c arranged between the tactile tip 6a and the mounting portion 6b of the tactile pin 6. The tactile pins 6 are held freely movable up and down between the upper 5e and the lower pin stopper 5f by their collars 6c.

Figure 5:
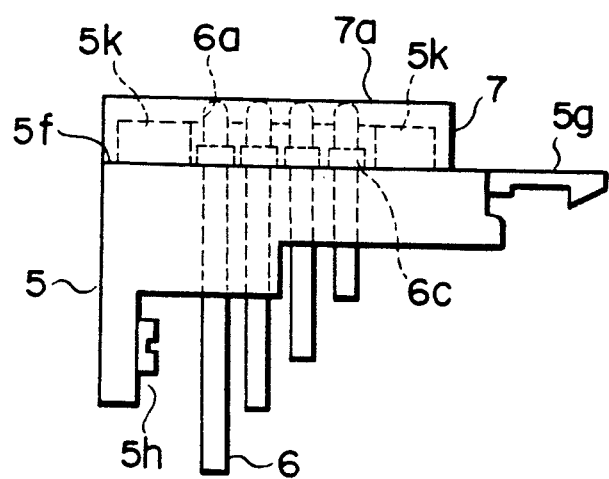
FIG. 5 is a side view showing the tactile section in the first embodiment of the present invention.

FIG. 4 is a perspective view showing how the tactile section 5 is attached to the base body 1 in the case of the first embodiment of the present invention. The base body 1 has an opening section formed in the front ends of the top 1a and the bottom 1b as shown in the left hand portion of FIG. 4. The tactile section 5 has such a structure as shown in FIGS. 4 and 5, wherein an engaging claw 5g made of elastic material is engaged with a claw stopper (not shown) in an engaged groove 1j on the top 1a of the base body 1. A fitting projection (not shown) made of elastic material is formed on the inner face of a stepped portion 5h at the tactile section 5 and fitted into a hole 1k formed at the front end face of the bottom 1b of the base body 1.

This tactile section, 5 is attached to the base body 1 in a horizontal direction as shown by an arrow in FIG. 4.

When the embodiment having such arrangement as described above is reset so that no braille character is displayed, when a DC voltage having such a polarity as that bends the free ends 2b of the piezoelectric element reeds 2 downward in FIG. 1 is applied to the piezoelectric element reeds 2. When DC voltage of this polarity is added to the piezoelectric element reeds 2, their free ends 2b are displaced downward so that the tactile pins can be dropped downward by their own weight to keep their tactile tips 6a retreated downward from the surface 7a of the tactile section 5.

When DC voltage having a polarity reverse to that of said DC voltage applied to bring the braille cell into a reset state is applied to the piezoelectric element reeds 2 needed to display braille characters, the piezoelectric element reeds 2 to which this DC voltage is applied curve their free ends 2b upward to project the tactile tips 6a of their corresponding touch pins 6 from the surface 7a of the tactile section 5. It is defined by the upper pin stopper 5e at the tactile section 5 against which the collars 6c of the tactile pins 6 are struck how for the tactile tips 6a of the tactile pins 6 are projected from the surface 7a of the tactile section 5.

When the braille cell is under reset state, the collars 6c of the tactile pins 6 are struck against the lower pin stopper 5f at the tactile section 5. The extent to which each of the tactile tips 6a of the tactile pins 6 is retreated from the surface 7a of the tactile section 5 can be thus defined however the piezoelectric element reeds 2 may be curved downward.

Figure 6:
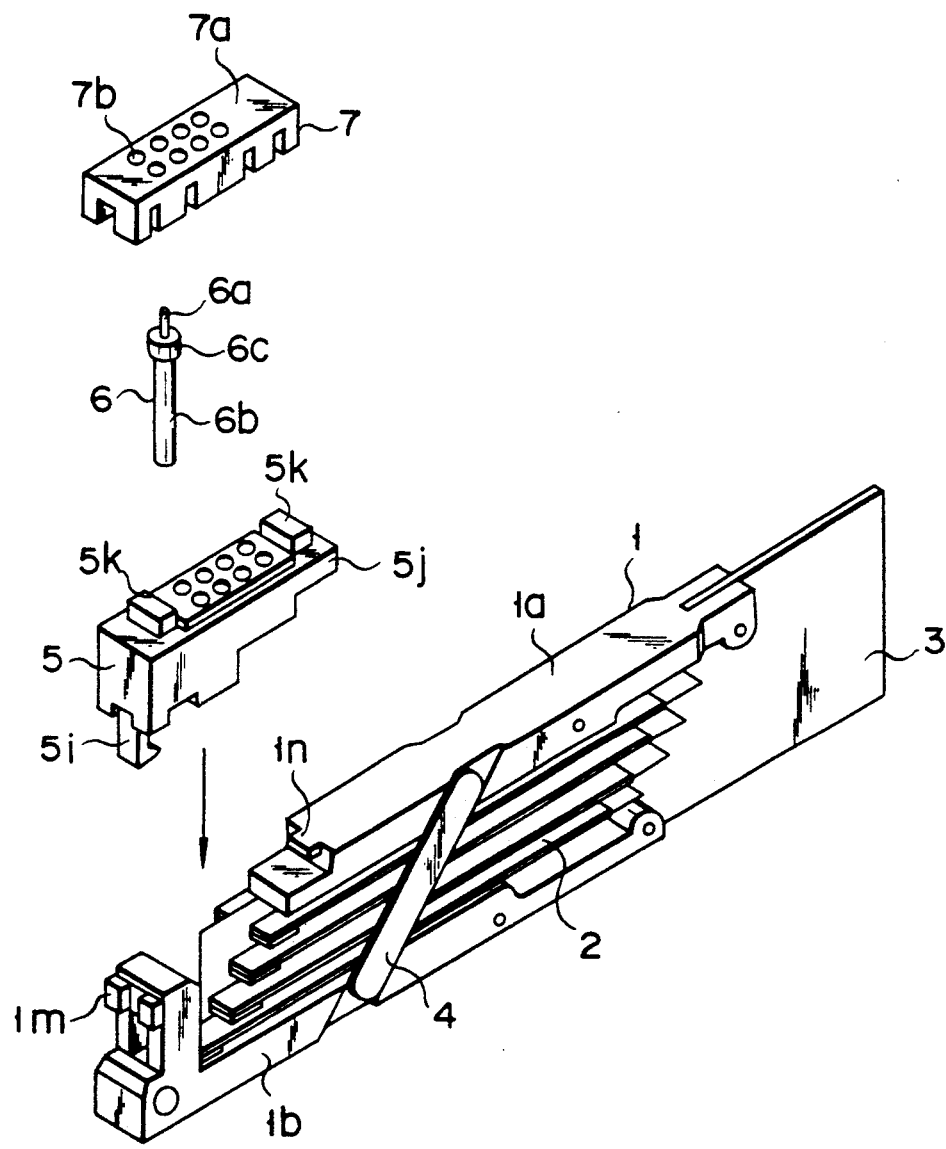
FIG. 6 is a perspective view showing the second embodiment of the present invention wherein the structure for detachably attaching the tactile section to the base is different from that in the first embodiment.

FIG. 6 is a perspective view showing the braille cell according to a second embodiment of the present invention.

In the case of this second embodiment, the tactile section 5 has an engaging claw 5i made of elastic material and directed downward, and an engaged groove 1m and a claw stopper (not shown) are formed at the front end portion of the bottom 1b of the base body 1 to correspond to the engaging claw 5i. In addition, an engaged projection 1n with which a step 5j of the tactile section 5 is engaged is formed at the top 1a of the base body 1.

The tactile section 5 of this second embodiment is fitted with the opening section formed with the front ends of the top 1a and the bottom 1b of the base body 1 (shown in the left hand portion of FIG. 6) in a vertical direction as shown by an arrow in FIG. 6.

Operations of the piezoelectric element reeds 2 and the tactile pins 6 in this second embodiment are same as those in the first embodiment.

Figure 7:
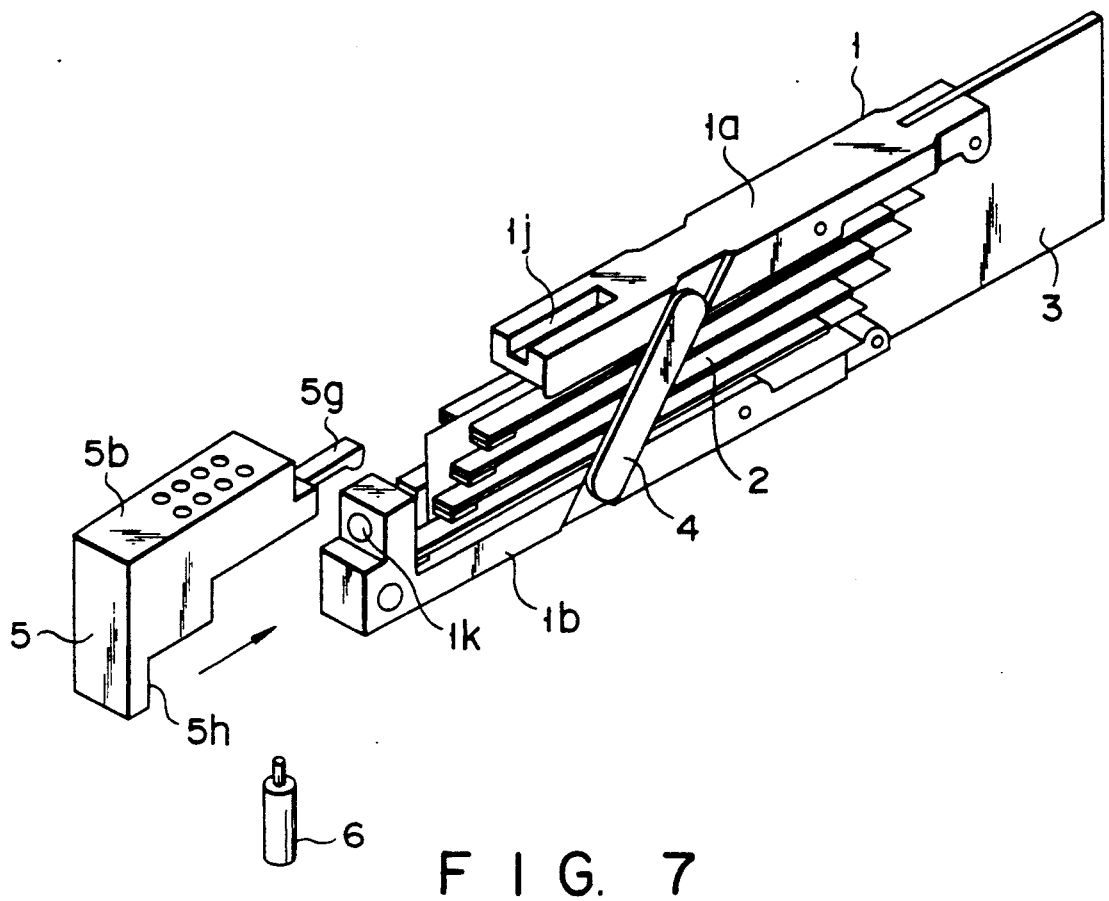
FIG. 7 is a perspective view showing the third embodiment of the present invention wherein the tactile section having no cap is made detachable.

FIG. 7 is a perspective view showing the braille cell according to a third embodiment of the present invention. As shown in FIG. 7, the tactile section 5 of this embodiment having same structure as that described in the case of the first embodiment of the present invention is detachably attached to the base body 1.

As shown in the enlarged sectional view in FIG. 3B, the tactile pins 6 are inserted from below into the tactile section 5. The tactile section is provided with through-holes 5c through which the tips 6a of the tactile pins 6 are projected outside from the surface 5b of the tactile section 5. In addition, each of the tactile pins 6 is provided with a step 6d, which is struck against the upper pin stopper 5e.

When the tactile section 5 is detachably attached to the base body 1 in the case of the braille cell according to the third embodiment of the present invention, while keeping the bottom 1b of the base body 1 upside, the tactile pins 6 can be prevented from coming out of the tactile section 5.

Figure 8:
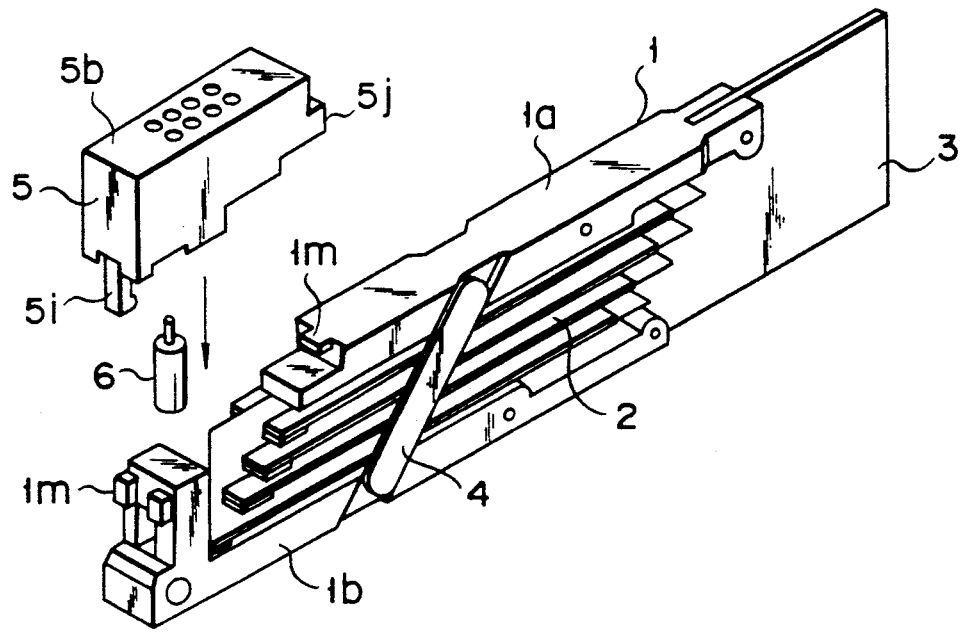
FIG. 8 is a perspective view showing the fourth embodiment of the present invention wherein the tactile section having no cap is made detachable.

FIG. 8 is a perspective view showing the braille cell according to a fourth embodiment of the present invention. The structure for attaching the tactile section 5 to the base body 1 is same as that in the second embodiment and the method of holding the tactile pins is same as that in the third embodiment of the present invention. Other components in this fourth embodiment are same as those in the first through third embodiments and description on these components will be omitted accordingly.

It should be understood that the present invention is not limited to the above-described embodiments and that various changes and modifications can be made without departing from the spirit and scope of the present invention.

When the braille cell is designed as described above, the tactile section can be more easily attached to and detached from the base body by the engaging means formed at the tactile section. In addition the tactile pins can be more easily exchanged with new ones and no specific care is needed to maintain the tactile pins in the tactile section. Further, the tactile section and the tactile pins can be washed as a unit without dismantling the tactile pins from the tactile section.

The position of each of the piezoelectric element reeds can be defined left and right the base body by the detachable fixing plates, so that the housing and assembling of the piezoelectric element reeds relative to the base body can be made easier.

When the means is provided to support and fix the base body and the print circuit board detachable from each other, the exchanging of the piezoelectric element reeds and the print circuit board can be made easier.

The stoppers provided at the free ends of the piezoelectric element reeds, not only prevents breakage during transportation, but also reduces chattering of the piezoelectric element reeds during operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A braille cell comprising:
    a plurality of piezoelectric element reeds, each one of said piezoelectric element reeds being bendable at an elongated end portion thereof when a DC voltage is applied thereto;
    a base body;
    each of said plurality of piezoelectric element reeds having a base end portion which is fixed to said base body;
    a printed circuit board mounted on said base body for supporting said plurality of piezoelectric element reeds in a plurality of groups, said plurality of groups being formed into a plurality of steps positioned at given intervals in said base body;
    a plurality of tactile pins corresponding in number to a plurality of free end portions of said piezoelectric element reeds;
    a tactile section for holding said plurality of tactile pins near said free end portions of said plurality of piezoelectric element reeds;

a respective one of said tactile pins being movable, responsive to a bending movement of a corresponding one of said plurality of piezoelectric element reeds; and said base body having an openable section for enabling said tactile section to be detachable from said base body, thereby facilitating cleaning and maintenance of said plurality of tactile pins without having to detach said plurality of tactile pins from said tactile section; and support means for detachably supporting and fixing said printed circuit board to said base body, said support means including a plurality of spring pins.

2. The braille cell according to claim 1, further comprising:

support means for supporting and fixing said tactile section, said tactile section including a detachable cap and said plurality of tactile pins, said support means supporting said tactile section such that said tactile section is detachable from said openable section of the base body by a movement of said tactile section in one of a horizontal and a vertical direction away from said openable section.

3. The braille cell according to claim 1, further comprising:

a lower stopper means provided on each of said plurality of tactile pins, said lower stopper means striking against an upper stopper means provided on a detachable cap when a respective one of said plurality of piezoelectric element reeds is actuated to enable a movement of a respective one of said plurality of tactile pins, thereby limiting a maximum movement of said respective one of said tactile pins.

4. A braille cell comprising:

a plurality of piezoelectric element reeds, each one of said piezoelectric element reeds being bendable at a front end portion thereof when a DC voltage is applied thereto, each front end portion having a free end portion;

a base body;

each of said plurality of piezoelectric element reeds having a base end portion which is fixed to said base body, said base body having first and second side portions;

a printed circuit board mounted to said base body for supporting said plurality of piezoelectric element reeds in a plurality of groups, said plurality of groups being formed into a plurality of steps at given intervals in said base body;

a plurality of tactile pins corresponding in number to said free end portions of said front end portions of said plurality of piezoelectric element reeds;

a respective one of said tactile pins being movable responsive to a bending movement of a respective one of said plurality of piezoelectric element reeds; and a pair of fixing plates detachably attached to each other and respectively to said first and second side portions, of said base body for separating said piezoelectric element reeds into first and second side groups in said base body; and wherein:

when said pair of fixing plates are attached to each other, said fixing plates hold said plurality of groups of said piezoelectric element reeds, said printed circuit board and said base body together; and when said pair of fixing plates when not attached to each other, said plurality of groups of piezoelectric element reeds, said printed circuit board and an interior portion of said base body are separable from each other, thereby facilitating maintenance of said plurality of groups of piezoelectric element reeds, said printed circuit board and said interior portion of said base body; and support means for detachably supporting and fixing said printed circuit board to said base body, said support means including a plurality of spring pins.

5. The braille cell according to claim 4, wherein:

said base body has an openable section;

said braille cell further comprises support means for supporting and fixing a tactile section;

said tactile section including a detachable cap and said plurality of tactile pins;

said support means supporting said tactile section such that said tactile section is detachable from an openable section of said base body by a movement of said tactile section in one of a horizontal and a vertical direction away from said openable section.

6. The braille cell according to claim 4, further comprising:

a lower stopper means provided on each of said free end portions of said plurality of tactile pins, said lower stopper means striking against an upper stopper means when a respective one of said plurality of piezoelectric element reeds is actuated to enable a movement of a respective one of said plurality of tactile pins, thereby limiting a maximum movement of said respective one of said tactile pins.

* * * * *